US011575446B2

(12) United States Patent
Sohn

(10) Patent No.: US 11,575,446 B2
(45) Date of Patent: Feb. 7, 2023

(54) OPTICAL SIGNAL COMMUNICATION METHOD AND DEVICE

(71) Applicant: FOUNDATION FOR RESEARCH AND BUSINESS, Seoul National University of Science and Technology, Seoul (KR)

(72) Inventor: Ill Soo Sohn, Seoul (KR)

(73) Assignee: FOUNDATION FOR RESEARCH AND BUSINESS, Seoul National University of Science and Technology, Seoul (KR)

( * ) Notice: Subject to any disclaimer, the term of this patent is extended or adjusted under 35 U.S.C. 154(b) by 15 days.

(21) Appl. No.: 17/600,780

(22) PCT Filed: Apr. 1, 2020

(86) PCT No.: PCT/KR2020/004445
§ 371 (c)(1),
(2) Date: Oct. 1, 2021

(87) PCT Pub. No.: WO2020/204593
PCT Pub. Date: Oct. 8, 2020

(65) Prior Publication Data
US 2022/0190927 A1    Jun. 16, 2022

(30) Foreign Application Priority Data

Apr. 2, 2019  (KR) .................. 10-2019-0038616
Jul. 23, 2019 (KR) .................. 10-2019-0088999

(51) Int. Cl.
H04B 10/54    (2013.01)
H04B 10/077   (2013.01)
(Continued)

(52) U.S. Cl.
CPC ......... *H04B 10/541* (2013.01); *H04B 10/077* (2013.01); *H04B 10/524* (2013.01); *H04B 10/67* (2013.01)

(58) Field of Classification Search
CPC .. H04B 10/541; H04B 10/077; H04B 10/524; H04B 10/67
(Continued)

(56) References Cited

U.S. PATENT DOCUMENTS 4,935,738 A * 6/1990 Pilato .................... B60C 23/043
                                              340/870.37
2009/0199065 A1  8/2009 Djordjevic et al.
(Continued)

FOREIGN PATENT DOCUMENTS

KR    20020080048    10/2002
KR    20130034510    4/2013
(Continued)

OTHER PUBLICATIONS

Hasan et al; Real-Time Healthcare Data Transmission for Remote Patient Monitoring in Patch-Based Hybrid OCC/BLE Networks; Mar. 2019; MDPI; pp. 1-23. (Year: 2019).*
(Continued)

*Primary Examiner* — Amritbir K Sandhu
(74) *Attorney, Agent, or Firm* — Daly Crowley Mofford & Durkee, LLP

(57) ABSTRACT

Disclosed are an optical signal communication method, and an optical signal transmission device and an optical signal reception device which perform the method. The optical signal communication method may comprise the steps of: receiving input data to be modulated into an optical signal, modulating the input data into the optical signal, and transmitting the optical signal to an optical signal reception device, wherein the optical signal includes a start pulse and
(Continued)

an end pulse, and a time interval between the start pulse and the end pulse is determined on the basis of a data value of the input data.

20 Claims, 15 Drawing Sheets

(51) Int. Cl.
*H04B 10/524* (2013.01)
*H04B 10/67* (2013.01)

(58) Field of Classification Search
USPC .......................................................... 398/186
See application file for complete search history.

(56) References Cited

U.S. PATENT DOCUMENTS

2019/0132000 A1\* 5/2019 Kim ..................... H04B 10/116
2022/0087528 A1\* 3/2022 Sohn .................. H04B 10/1121

FOREIGN PATENT DOCUMENTS

| KR | 2018004927 | A | \* | 1/2018 | ........... H04B 10/116 |
| KR | 20180004927 | | | 1/2018 | |

OTHER PUBLICATIONS

Search Report and Written Opinion with English translation dated Jul. 8, 2020 for PCT Application No. PCT/KR2020/004445; 8 pages.

\* cited by examiner

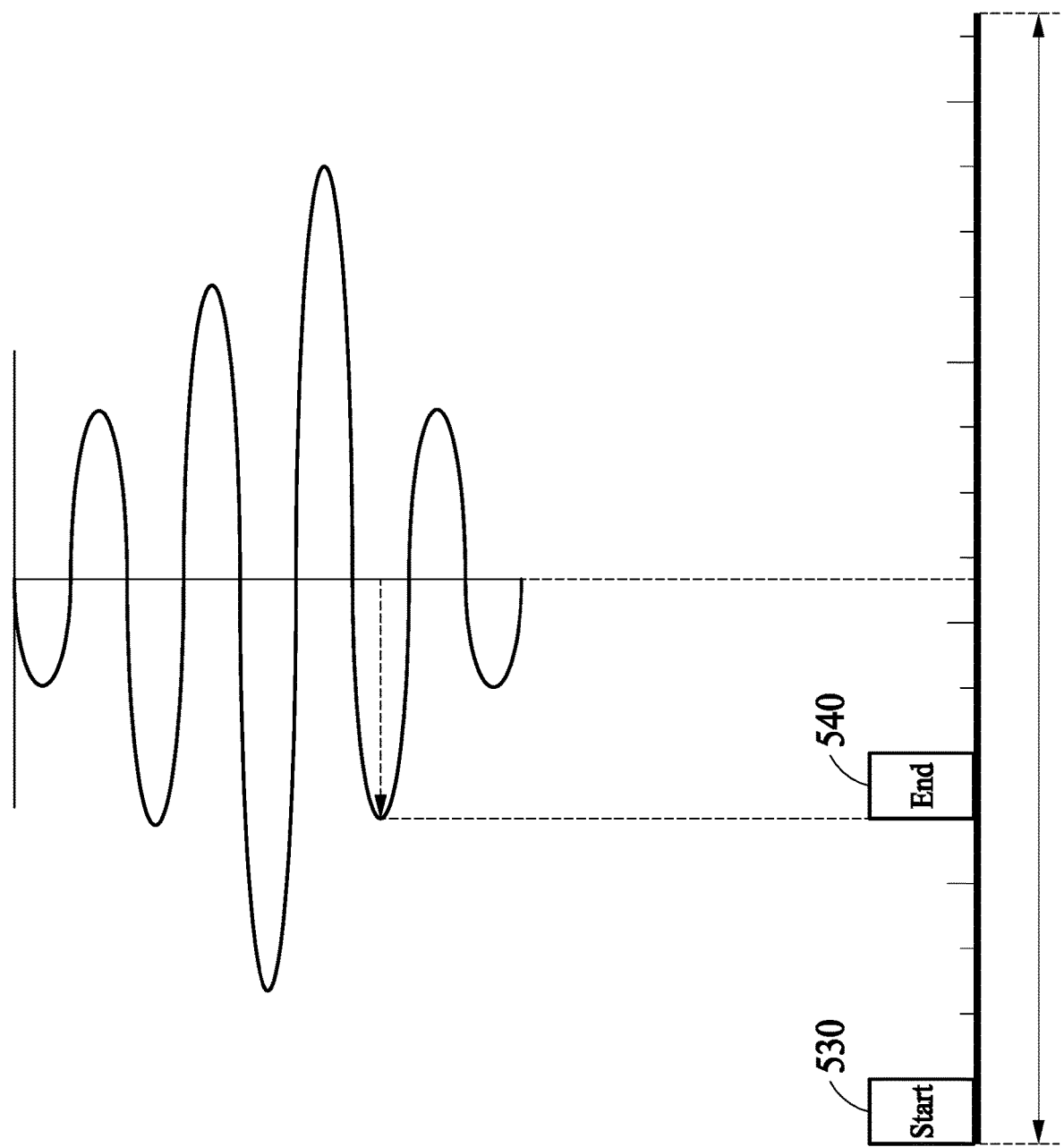

OPTICAL SIGNAL COMMUNICATION METHOD AND DEVICE

CROSS REFERENCE TO RELATED APPLICATION

This application is a U.S. national stage filing under 35 U.S.C § 371 of PCT application number PCT/KR2020/004445 filed on Apr. 1, 2020, and entitled "OPTICAL SIGNAL COMMUNICATION METHOD AND DEVICE" which is based on and claims priority to Korean Patent Application No. 10-2019-0038616, filed on Apr. 2, 2019 and Korean Patent Application No. 10-2019-0088999, filed on Jul. 23, 2019 which applications are each hereby incorporated herein by reference in their entireties.

TECHNICAL FIELD

The following description relates to a technology for optical signal communication.

BACKGROUND ART

The aging population is increasing and medical and social security expenditures are thus rapidly increasing, which is becoming a major social and economic issue. To resolve these issues, medical devices using information and communication technology (ICT) are emerging. These ICT-based medical devices are provided in various forms that are attachable to the human body, directly worn on the body, or insertable in the body. The medical devices may detect various signals of a living body, transmit the detected signals to an external device, and provide real-time diagnosis and treatment.

As the functions of implantable medical devices contributing to convenience, stability, and accuracy have become more diversified, the implantable medical devices are being more widely used, increasing their presence. However, medical devices including existing radio frequency (RF)-based wireless communication modules may consume a large amount of power, and batteries in the devices may thus be rapidly exhausted. For example, a patient with such a medical device implanted in his or her body through a medical procedure may need to have another procedure for replacing a battery of the medical device when the battery is exhausted, and thus the patient with the medical device may experience great inconvenience and potential risks. Thus, there is a desire for research to resolve these issues.

DISCLOSURE OF THE INVENTION

Technical Solutions

According to an aspect, there is provided an optical signal communication method performed by an optical signal transmission device, the optical signal communication method including receiving input data to be modulated into an optical signal, modulating the input data into the optical signal, and transmitting the optical signal to an optical signal reception device. The optical signal may include a start pulse and an end pulse. A time interval between the start pulse and the end pulse may be determined based on a data value of the input data.

A wavelength of the start pulse and a wavelength of the end pulse may be different from each other.

The optical signal may include only the start pulse and the end pulse and may not include another pulse between the start pulse and the end pulse.

The modulating into the optical signal may include dividing the input data into first sub-data and second sub-data, and modulating the first sub-data and the second sub-data into a first optical signal and a second optical signal, respectively. The first optical signal corresponding to the first sub-data may represent a data value of first bits of the input data, and the second optical signal corresponding to the second sub-data may represent a data value of second bits of the input data.

The optical signal reception device may receive at least one of the first optical signal and the second optical signal from the optical signal transmission device and may determine not to demodulate the received at least one of the first optical signal and the second optical signal when a time interval between a time point at which the first optical signal is received and a time point at which the second optical signal is received is greater than a preset threshold value.

The first bits and the second bits may correspond to an upper bit and a lower bit of the input data, respectively, or correspond to even bits and odd bits of the input data, respectively.

In the modulating into the optical signal, each of the first sub-data and the second sub-data may include an identifier bit indicating whether each of the first sub-data and the second sub-data includes the first bits or second bits of the input data.

According to another aspect, there is provided an optical signal communication method performed by an optical signal reception device, the optical signal communication method including receiving an optical signal from an optical signal transmission device and obtaining data corresponding to the optical signal by demodulating the received optical signal. The optical signal may include a start pulse and an end pulse. A time interval between the start pulse and the end pulse may be determined based on a data value of the data.

The obtaining of the data may include determining the data corresponding to the optical signal based on a time interval between the start pulse and the end pulse received from the optical signal transmission device.

The optical signal may include at least one of error detection information for determining whether there is an error in the optical signal and error correction information for correcting the error of the optical signal.

The optical signal reception device may recognize the start pulse and the end pulse based on the widths of the signal pulses included in the optical signal.

When a second start pulse is sequentially recognized after a first start pulse, the optical signal reception device may determine not to demodulate the optical signal that is based on the first start pulse.

When a time interval between a time point at which the start pulse is recognized and a time point at which the end pulse is recognized is greater than a threshold value, the optical signal reception device may determine not to demodulate the optical signal that is based on the start pulse and the end pulse.

According to still another aspect, there is provided an optical signal transmission device for performing an optical signal communication method, the optical signal transmission device including a modulator configured to modulate input data into an optical signal, and a communicator configured to transmit the optical signal to an optical signal reception device. The optical signal may include a start pulse and an end pulse. A time interval between the start pulse and the end pulse may be determined based on a data value of the input data.

According to yet another aspect, there is provided an optical signal reception device for performing an optical signal communication method, the optical signal reception device including a communicator configured to receive an optical signal from an optical signal transmission device, and a demodulator configured to obtain data corresponding to the optical signal by demodulating the received optical signal. The optical signal may include a start pulse and an end pulse. A time interval between the start pulse and the end pulse may be determined based on a data value of the data.

Effects

According to an example embodiment, it is possible to develop an ultra-low power wireless data transmission communication module for an implantable medical biometric monitoring device.

According to an example embodiment, developing an implantable ultra-low power wireless data transmission communication module may minimize the inconvenience a patient may experience to get a battery of the communication module replaced.

According to an example embodiment, indicating information at an interval between a start pulse and an end pulse may reduce an amount of time used for a light source to output light and reduce power consumption.

According to an example embodiment, setting different wavelengths for a start pulse and an end pulse may enable an optical signal reception device to distinguish the start pulse and the end pulse. Thus, even when an error occurs during signal transmission and reception, a signal to be transmitted and received subsequently may not be affected thereby.

According to an example embodiment, even when a point in time at which an end pulse is received is inaccurate, recognizing the point with information of an adjacent point may minimize an error in transmitting and receiving information.

According to an example embodiment, dividing data into a plurality of sets of sub-data and transmitting the sets of sub-data may increase accuracy in transmitting and receiving information.

According to an example embodiment, dividing data into even bits and odd bits and into sub-data including the even bits and sub-data including the odd bits may improve accuracy in transmission and reception for bits that may greatly affect a total value when an error in transmission and reception occurs.

According to an example embodiment, adding an identifier bit representing an order between divided sets of sub-data to the sub-data may improve accuracy in transmitting and receiving data.

According to an example embodiment, setting a maximum value of a time interval for receiving an end pulse after receiving a start pulse may minimize an influence of an error on a signal to be transmitted and received subsequently even when the error occurs during signal transmission and reception.

BRIEF DESCRIPTION OF DRAWINGS

FIGS. 5A and 5B are diagrams illustrating examples of an optical signal according to an example embodiment.

BEST MODE FOR CARRYING OUT THE INVENTION

Hereinafter, example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Figure 1:
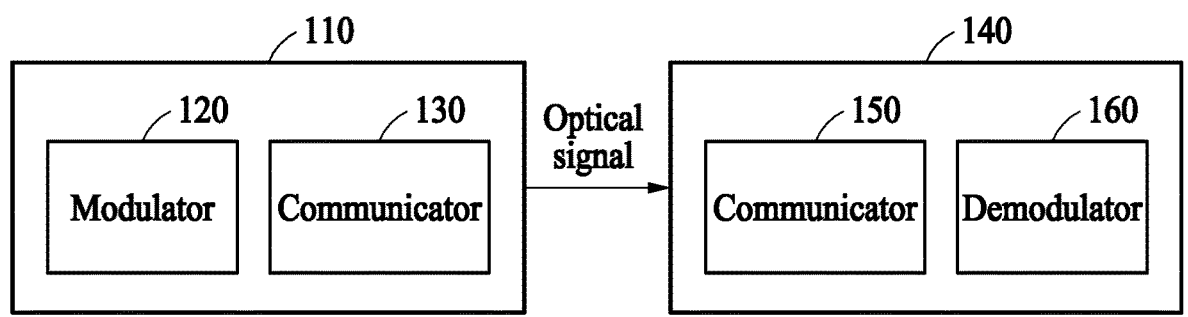
FIG. 1 is a diagram illustrating an example of an optical signal communication system according to an example embodiment.

FIG. 1 is a diagram illustrating an example of an optical signal communication system according to an example embodiment.

Referring to FIG. 1, an optical signal communication system may perform low-power wireless communication using a light-emitting diode (LED) of which power is consumed only while a power supply is on.

According to an example embodiment, an optical signal communication method may be performed through an optical signal transmission device 110 and an optical signal reception device 140. The optical signal transmission device 110 may modulate input data into an optical signal and transmit the optical signal to the optical signal reception device 140. In addition, the optical signal reception device 140 may demodulate the optical signal received from the optical signal transmission device 110 and obtain data corresponding to the optical signal.

The optical signal transmission device 110 may reduce power consumption by minimizing an amount of time used for a light source to output light when the optical signal transmission device 110 transmits the optical signal to the optical signal reception device 140. In addition, the optical signal transmission device 110 may minimize power consumption and minimize an error in a process of transmitting and receiving the optical signal by modulating the input data into the optical signal including a start pulse and an end pulse having a different time interval therebetween for outputting light.

The optical signal transmission device 110 may minimize an error in transmitting the optical signal based on at least one of different wavelengths of the start pulse and the end pulse corresponding to the optical signal, an identifier bit for representing an order of sets of sub-data, divided input data, different widths of the start pulse and end pulse, and error detection information or error correction information included in the optical signal. The identifier bit included in sub-data may represent, for example, which of first bits and second bits of the input data are included in the sub-data.

According to an example embodiment, the optical signal transmission device 110 may divide input data into first sub-data and second sub-data. The optical signal transmission device 110 may modulate the first sub-data and the second sub-data into a first optical signal and a second optical signal, respectively. The first optical signal corresponding to the first sub-data may represent a data value of first bits of the input data, and the second optical signal corresponding to the second sub-data may represent a data value of second bits of the input data.

For example, the optical signal transmission device 110 may divide the input data into the first sub-data corresponding to an upper bit and the second sub-data corresponding to a lower bit. For another example, the optical signal transmission device 110 may divide the input data into the first sub-data including even bits of the input data and the second sub-data including odd bits of the input data. The optical signal transmission device 110 may generate the first optical signal from the first sub-data and generate the second optical signal from the second sub-data.

However, examples are not limited to the foregoing example in which the optical signal transmission device 110 divides the input data into two sets of sub-data. According to example embodiments, the optical signal transmission device 110 may divide the input data into three or more sets of sub-data. In addition, examples are not limited to the foregoing example in which the sets of sub-data are divided by an upper bit and a lower bit or even bits and odd bits, and the sets of sub-data may be divided by various methods.

The optical signal reception device 140 may obtain the data corresponding to the optical signal based on a time interval between the start pulse and the end pulse of the optical signal. In addition, the optical signal reception device 140 may minimize an error in receiving the optical signal, based on at least one of different wavelengths of the start pulse and the end pulse corresponding to the optical signal, an identifier bit for representing an order of sets of sub-data, different widths of the start pulse and the end pulse, a threshold value corresponding to a time interval between the start pulse and the end pulse, and error detection information or error correction information included in the optical signal. The identifier bit included in the sub-data may be used by the optical signal reception device 140 to determine an order of sets of sub-data obtained from a plurality of optical signals. The optical signal reception device 140 may combine the sets of sub-data based on the determined order.

The threshold value corresponding to the time interval between the start pulse and the end pulse may indicate a maximum value of the time interval between a time point at which the start pulse is recognized and a time point at which the end pulse is recognized. When a time interval between a time point at which the start pulse is received and a time point at which the end pulse is received is greater than a threshold value, the optical signal reception device 140 may disregard the optical signal based on the start pulse and the end pulse.

According to an example embodiment, the optical signal transmission device 110 may include a modulator 120 and a communicator 130. The optical signal reception device 140 may include a communicator 150 and a demodulator 160. The optical signal transmission device 110 may modulate input data into an optical signal through the modulator 120. The communicator 130 may transmit the optical signal to the optical signal reception device 140. The optical signal reception device 140 may receive the optical signal transmitted by the optical signal transmission device 110 through the communicator 150. The demodulator 160 may demodulate the optical signal and obtain data corresponding to the optical signal. The demodulator 160 may determine whether the data is upper data or lower data based on an identifier bit included in the obtained data. The demodulator 160 may determine not to demodulate the received optical signal when an error is in the received optical signal based on the identifier bit.

Figure 2:
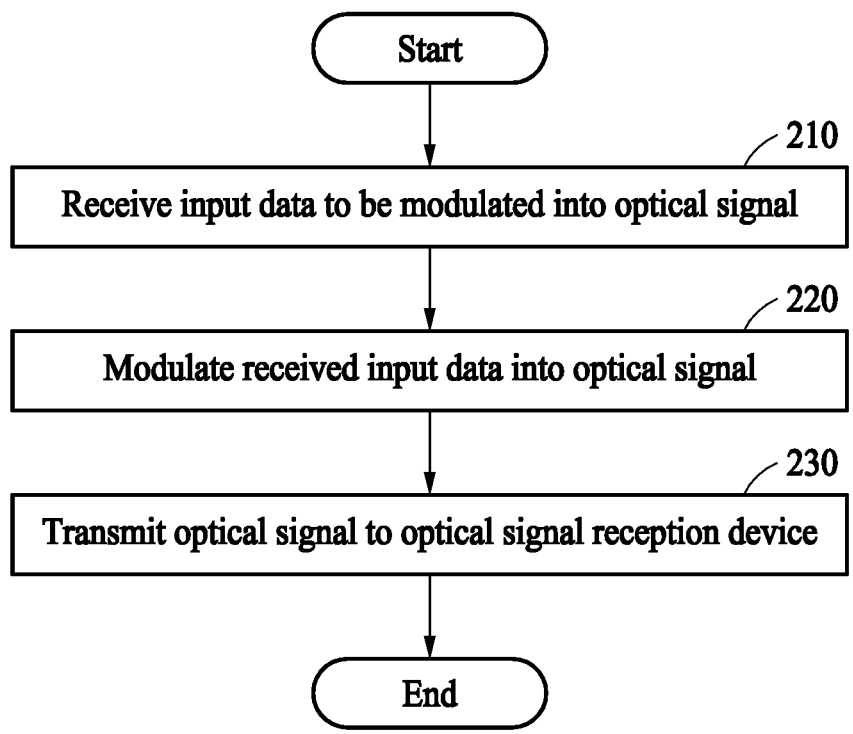
FIG. 2 is a flowchart illustrating an example of an optical signal communication method according to an example embodiment.

FIG. 2 is a flowchart illustrating an example of an optical signal communication method according to an example embodiment.

Referring to FIG. 2, in operation 210, an optical signal transmission device may receive input data to be modulated into an optical signal. According to an example embodiment, a receiver included in the optical signal transmission device may receive the input data. The input data may have, for example, an 8-bit data value in a binary form.

In operation 220, the optical signal transmission device may modulate the received input data into an optical signal.

The optical signal may include a start pulse and an end pulse, and a time interval between the start pulse and the end pulse may be determined based on a data value of the input data. In addition, a wavelength of the start pulse and a wavelength of the end pulse may be different from each other. The start pulse may be a signal pulse indicating a start of the optical signal, and the end pulse may indicate an end of the optical signal. A pulse may indicate a signal in which a logic level is maintained at 1. Herein, light output from the optical signal transmission device may correspond to a signal in which a logic level is maintained at 1.

In operation 230, the optical signal transmission device may transmit the optical signal to an optical signal reception device. The optical signal transmitted from the optical signal transmission device to the optical signal reception device may include the start pulse and the end pulse. According to an example embodiment, the optical signal may not include another pulse between the start pulse and the end pulse or any other pulses besides the start pulse and the end pulse.

According to another example embodiment, the optical signal transmission device may divide the input data into a plurality of sets of sub-data and generate optical signals respectively corresponding to the divided sets of the sub-data. For example, the optical signal transmission device may divide the input data into first sub-data and second sub-data. The optical signal transmission device may modulate the first sub-data into a first optical signal and modulate the second sub-data into a second optical signal. The first optical signal corresponding to the first sub-data may represent a data value of an upper bit of the input data, and the second optical signal corresponding to the second sub-data may represent a data value of a lower bit of the input data.

According to another example embodiment, the optical signal transmission device may divide the input data into even bits and odd bits, divide the input data into first sub-data including the even bits and second sub-data including the odd bits, and generate optical signals respectively corresponding to the first sub-data and the second sub-data.

According to another example embodiment, the optical signal transmission device may generate first sub-data and second sub-data based on the input data. In this example, the first optical signal corresponding to the first sub-data may represent a data value of an upper bit of the input data, and the second optical signal corresponding to the second sub-data may represent a data value of a lower bit of the input data. The first sub-data and the second sub-data may include an identifier bit for representing which of first bits and second bits of the input data are included. For example, the identifier bit may represent which of an upper bit and a lower bit of the input data is included in sub-data including the identifier bit or which of even bits and odd bits of the input data are included in the sub-data including the identifier bit.

According to another example embodiment, the optical signal reception device may receive at least one of the first optical signal and the second optical signal from the optical signal transmission device, and determine not to demodulate at least one of the first optical signal and the second optical signal when a time interval between a time point at which the first optical signal is received and a time point at which the second optical signal is received is greater than a preset threshold value. The threshold value may be determined based on a predetermined value and shared between the optical signal transmission device and the optical signal reception device.

Figure 3:
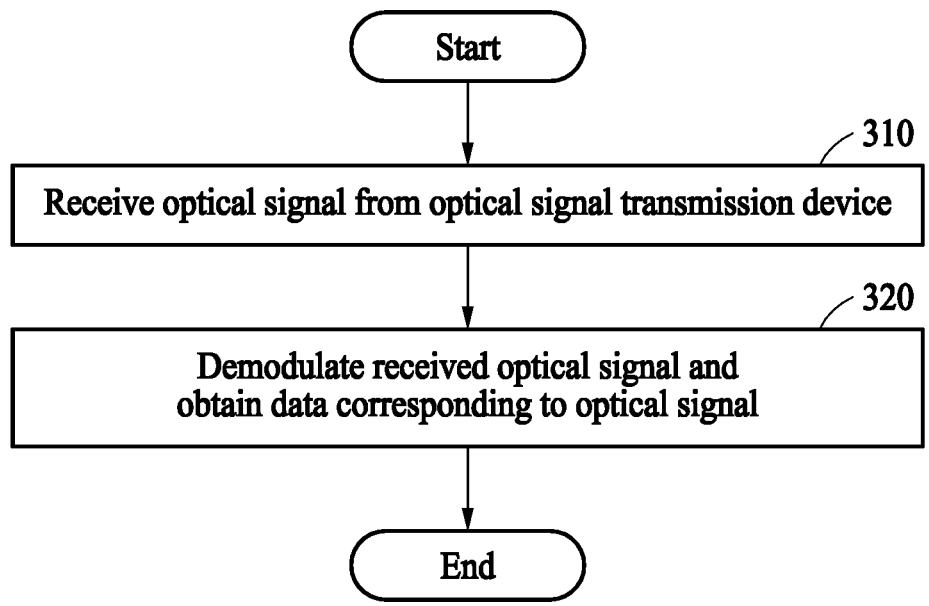
FIG. 3 is a flowchart illustrating an example of an optical signal reception method according to an example embodiment.

FIG. 3 is a flowchart illustrating an example of an optical signal reception method according to an example embodiment.

Referring to FIG. 3, in operation 310, an optical signal reception device may receive an optical signal from an optical signal transmission device. In operation 320, the optical signal reception device may demodulate the received optical signal and obtain data corresponding to the optical signal.

According to an example embodiment, since the optical signal transmission device modulates input data into the optical signal and transmits the optical signal to the optical signal reception device, the optical signal reception device may obtain the data corresponding to the optical signal from the optical signal through a process of demodulating the optical signal. The optical signal may include a start pulse and an end pulse, and a time interval between the start pulse and the end pulse may be determined based on a data value of the obtained data. Thus, the optical signal reception device may determine the data corresponding to the optical signal based on the time interval between the start pulse and the end pulse received from the optical signal transmission device.

According to another example embodiment, wavelengths of the start pulse and end pulse corresponding to the optical signal may be different from each other. The optical signal reception device may distinguish the start pulse and the end pulse based on a wavelength of a signal pulse.

According to another example embodiment, the optical signal reception device may obtain the data corresponding to the optical signal through a process of demodulating the optical signal. When the obtained data includes an identifier bit, the optical signal reception device may recognize the data including the identifier bit as sub-data. The optical signal reception device may combine sets of sub-data including an identifier bit into single data based on the identifier bit.

According to another example embodiment, a width of the start pulse and a width of the end pulse corresponding to the optical signal may be different from each other. A width of a signal pulse may refer to a time interval in which a signal value is maintained or a logic level of 1 is maintained. A width of a signal pulse described herein may also refer to a time interval during which the optical signal transmission device maintains outputting light. Since the widths of the start pulse and end pulse corresponding to the optical signal are different, the optical signal reception device may recognize the start pulse and the end pulse based on a width of a signal pulse included in the optical signal. Thus, even though the optical signal reception device receives a start pulse corresponding to another optical signal while not receiving an end pulse corresponding to an optical signal after receiving a start pulse corresponding to the optical signal, the optical signal reception device may still receive the other optical signal without an error. In such a case, the optical signal reception device may not receive an end pulse corresponding to the optical signal, and may thus not perform demodulation on the optical signal. For example, when a second start pulse is sequentially recognized after a first start pulse, the optical signal reception device may determine that an error occurs in a process of transmitting and receiving an optical signal that is based on the first start pulse, and determine not to demodulate the optical signal that is based on the first start pulse.

According to another example embodiment, the optical signal may include at least one of error detection information used for the optical signal reception device to determine whether there is an error of the optical signal, and error correction information used for the optical signal reception device to correct an error of the optical signal.

The optical signal reception device may determine whether there is an error in data extracted through the received optical signal based on the error detection information. The optical signal transmission device may include the error detection information in the optical signal in a process of modulating the input data into the optical signal. In addition, the error detection information may already be included in the input data from a time when the optical signal transmission device receives the input data. The error detection information may correspond to a parity bit, for example.

The optical signal reception device may correct an error in data extracted through the received optical signal based on the error correction information. Since the error correction information includes information associated with data corresponding to the optical signal, the optical signal reception device may correct the error in the data extracted from the optical signal based on the information included in the error correction information. Thus, even when the optical signal reception device detects an error in the data extracted from the optical signal, the optical signal reception device may correct the error in the data by itself using the error correction information without an additional transmitting and receiving process.

According to another example embodiment, when a time interval between a time point at which the start pulse is recognized and a time point at which the end pulse is recognized is greater than a threshold value, the optical signal reception device may determine not to demodulate the optical signal that is based on the start pulse and the end pulse. The threshold value may indicate a maximum value of the time interval between the start pulse and the end pulse. To allow the optical signal reception device to normally receive the optical signal, the optical signal transmission device may need to transmit the end pulse of the optical signal to the optical signal reception device before a time corresponding to the threshold value elapses from a time point at which the optical signal transmission device transmits the start pulse of the optical signal to the optical signal reception device. The threshold value may be determined by the optical signal transmission device and shared with the optical signal reception device.

Figure 4A:
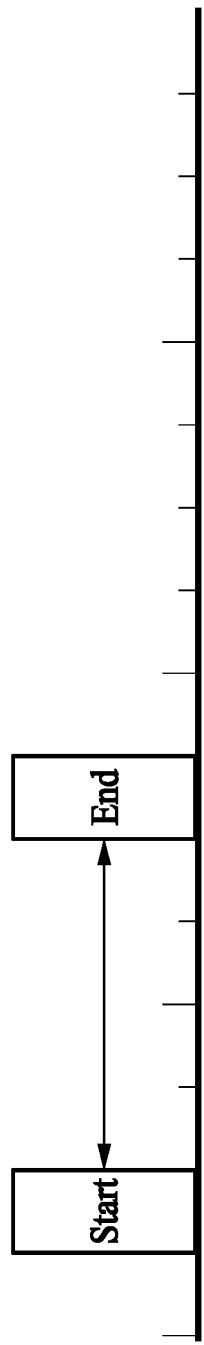
FIGS. 4A and 4B are diagrams illustrating examples of an optical signal according to an example embodiment.
Figure 4B:
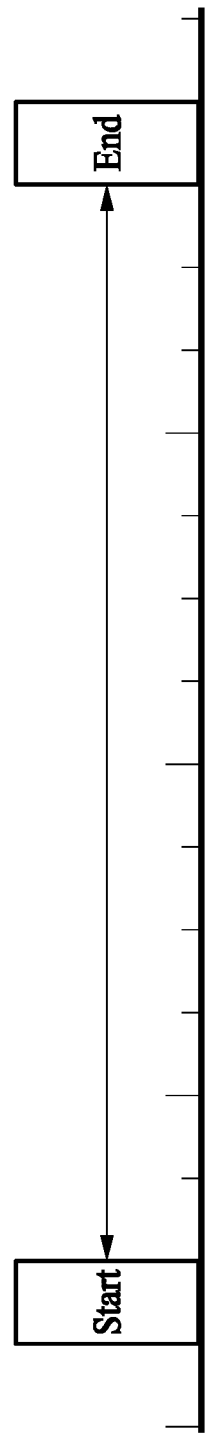

FIGS. 4A and 4B are diagrams illustrating an example of an optical signal according to an example embodiment.

Referring to FIGS. 4A and 4B, an optical signal may include a start pulse and an end pulse. An optical signal transmission device may determine a time interval between a time point at which the start pulse is transmitted and a time point at which the end pulse is transmitted based on a data value of input data. The optical signal transmitted by the optical signal transmission device may include only the start pulse and the end pulse. In addition, the optical signal transmission device may output light only at a time point of transmitting the start pulse and a time point of transmitting the end pulse, thereby minimizing power consumption. An optical signal reception device may determine data corresponding to the optical signal based on a time interval between a time point at which the start pulse is received and a time point at which the end pulse is received.

Referring to FIG. 4A, there are four spaces in a time interval between a time point at which the optical signal transmission device transmits the start pulse or the optical signal reception device receives the start pulse, and a time point at which the optical signal transmission device transmits the end pulse or the optical signal reception device receives the end pulse. Each of the spaces between the start pulse and the end pulse may indicate a preset time interval. In this example, a data value of data corresponding to the optical signal may be 4, and the optical signal reception device may determine the data value as 4 based on a time interval between the time point at which the start pulse is received and the time point at which the end pulse is received. The optical signal reception device may demodulate and process the data value into an 8-bit binary number.

Referring to FIG. 4B, there are 13 spaces in a time interval between a time point at which the optical signal transmission device transmits the start pulse or the optical signal reception device receives the start pulse, and a time point at which the optical signal transmission device transmits the end pulse or the optical signal reception device receives the end pulse. In this example, a data value of data corresponding to the optical signal may be 13, and the optical signal reception device may determine the data value as 13 based on a time interval between the time point at which the start pulse is received and the time point at which the end pulse is received.

Figure 5A:
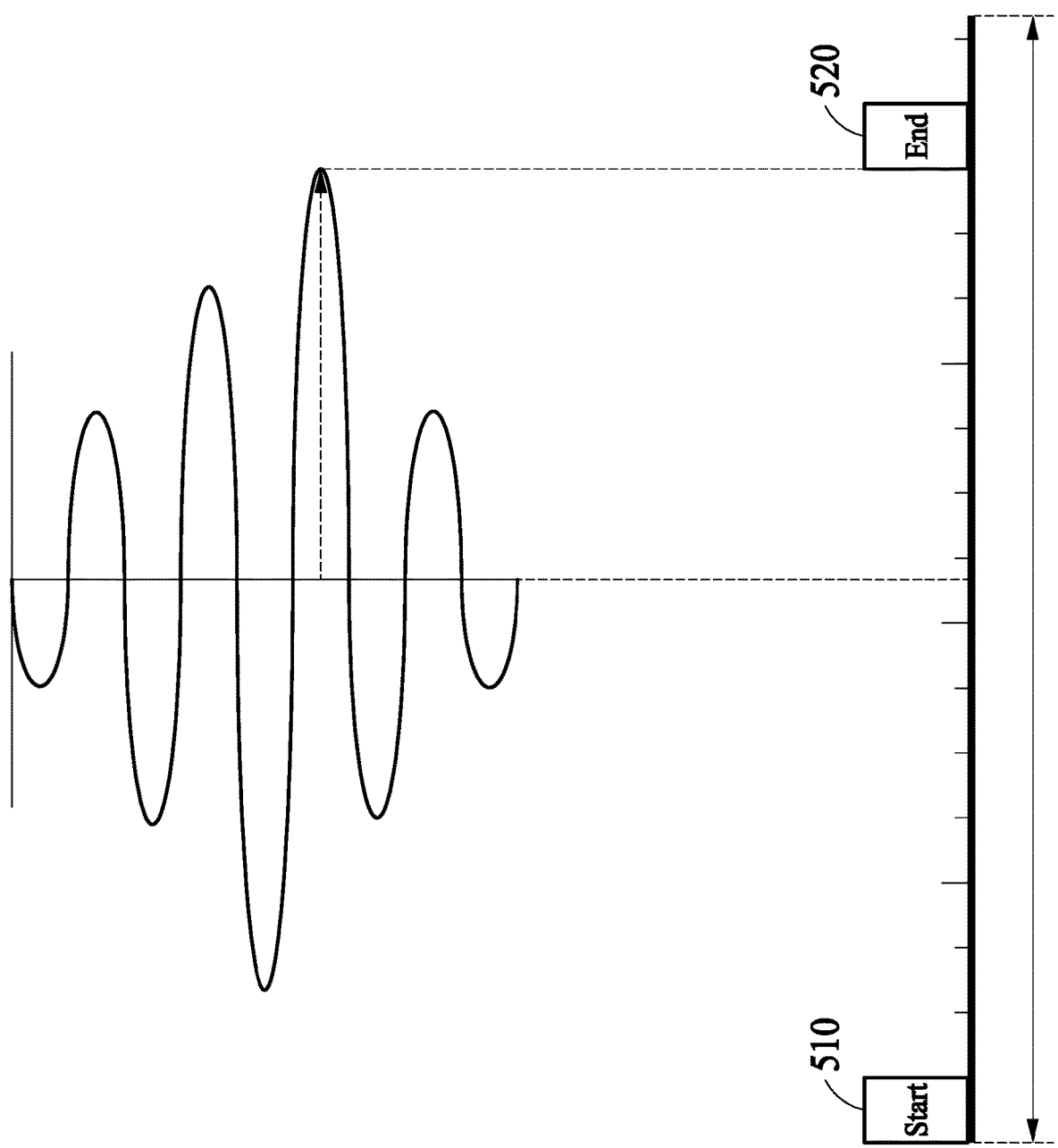

FIGS. 5A and 5B are diagrams illustrating examples of an optical signal according to an example embodiment.

Referring to FIGS. 5A and 5B, an optical signal transmission device may determine a transmission time point of each of a start pulse and an end pulse corresponding to an optical signal based on continuous input data formed in a curved shape and having a decimal format. The optical signal transmission device may encode the input data. The optical signal transmission device may modulate the encoded data into the optical signal. The optical signal may represent a data value of data corresponding to the input data by a time interval between the start pulse and the end pulse.

Referring to FIGS. 5A and 5B, there are spaces divided at regular intervals between the start pulse and the end pulse, and an optical signal reception device may recognize the time interval between the start pulse and the end pulse by the number of the spaces. For example, the number of the spaces may be 1024.

The optical signal transmission device may determine a time interval between a time point at which the start pulse is transmitted and a time point at which the end pulse is transmitted based on a data value of the input data. In addition, the optical signal transmission device may determine the time point at which the end pulse is transmitted based on the time interval between the start pulse and the end pulse.

Referring to FIG. 5A, to transmit a first optical signal to the optical signal reception device, the optical signal transmission device may transmit a start pulse 510 corresponding to the first optical signal to the optical signal reception device. The optical signal reception device may start a time count from a time point at which the start pulse 510 corresponding to the first optical signal is received. The optical signal transmission device may determine a time interval between the start pulse 510 and an end pulse 520 based on a data value corresponding to the optical signal. The optical signal transmission device may determine a transmission time point at which the end pulse 520 is to be transmitted to the optical signal reception device after a time point at which the start pulse 510 is transmitted to the optical signal reception device based on the time interval between the start pulse 510 and the end pulse 520. The optical signal transmission device may transmit the end pulse 520 to the optical signal reception device based on the determined transmission time point. The optical signal reception device may terminate the time count at a time point at which the end pulse 520 is received from the optical signal transmission device. The optical signal reception device may extract data corresponding to the first optical signal based on a result of the time count.

Referring to FIG. 5B, to transmit a second optical signal to the optical signal reception device, the optical signal transmission device may transmit a start pulse 530 corresponding to the second optical signal to the optical signal reception device. The optical signal reception device may start a time count from a time point at which the start pulse 530 corresponding to the second optical signal is received. The optical signal transmission device may determine a time interval between the start pulse 530 and an end pulse 540 based on a data value corresponding to the optical signal. The optical signal transmission device may determine a transmission time point at which the end pulse 540 is to be transmitted to the optical signal reception device after a time point at which the start pulse 530 is transmitted to the optical signal reception device based on the time interval between the start pulse 530 and the end pulse 540. The optical signal transmission device may transmit the end pulse 540 to the optical signal reception device based on the determined transmission time point. The optical signal reception device may terminate the time count at a time point at which the end pulse 540 is received from the optical signal transmission device. The optical signal reception device may extract data corresponding to the second optical signal based on a result of the time count.

Comparing the examples in FIGS. 5A and 5B, the time interval between the start pulse 510 and the end pulse 520 corresponding to the first optical signal may be greater than the time interval between the start pulse 530 and the end pulse 540 corresponding to the second optical signal. Based on this, it may be determined that a size of the data value corresponding to the first optical signal is greater than a size of the data value corresponding to the second optical signal. According to an example embodiment, when a time interval between a start pulse and an end pulse corresponding to one optical signal is greater than a time interval between a start pulse and an end pulse corresponding to another optical signal, it may be determined that a data value corresponding to the one optical signal is greater than a data value corresponding to the other optical signal. In contrast, when a time interval between a start pulse and an end pulse corresponding to one optical signal is less than a time interval between a start pulse and an end pulse corresponding to another optical signal, it may be determined that a data value corresponding to the one optical signal is less than a data value corresponding to the other optical signal.

Figure 6:
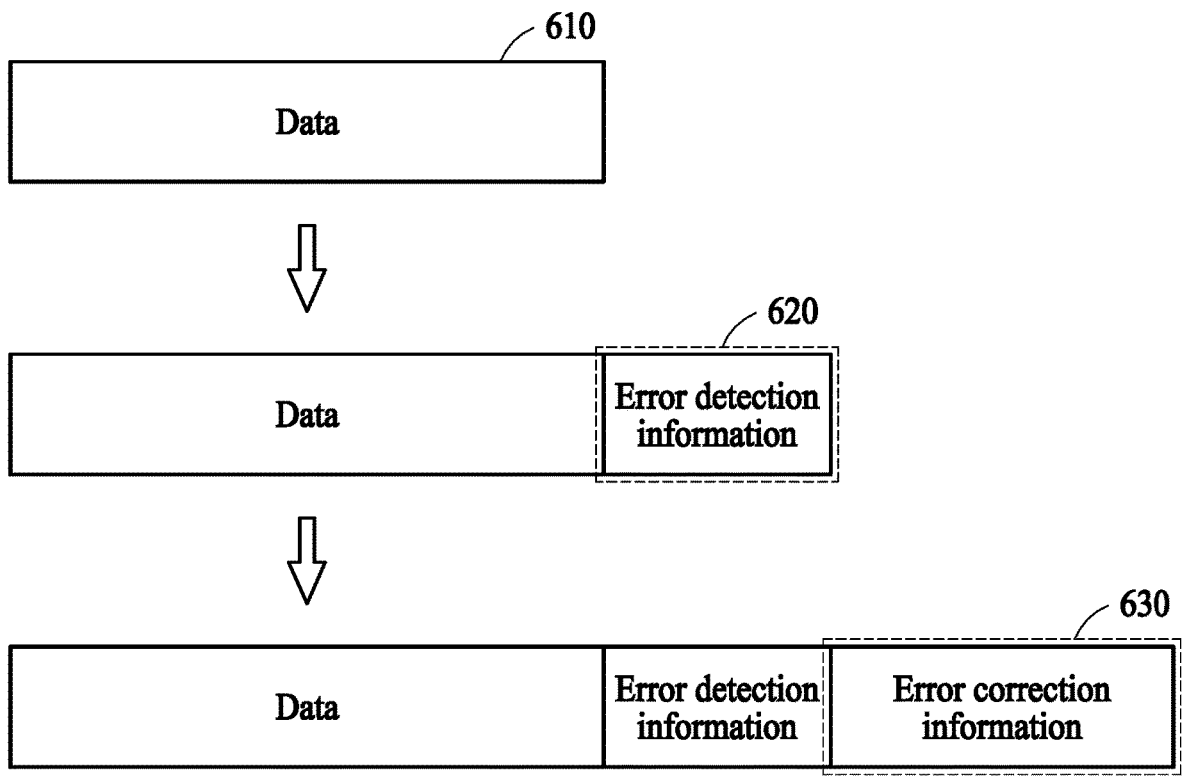
FIG. 6 is a diagram illustrating an example of data to which error detection information and error correction information are added according to a first example embodiment.

FIG. 6 is a diagram illustrating an example of data to which error detection information and error correction information are added according to a first example embodiment.

Referring to FIG. 6, according to a first example embodiment, an optical signal transmission device may receive data 610. The optical signal transmission device may add, to the received data 610, at least one of error detection information 620 and error correction information 630 to prevent an error from occurring.

The optical signal transmission device may add the error detection information 620 to the data 610 such that an optical signal reception device receiving the data 610 may determine whether there is an error in the data 610. The error detection information 620 may be a parity bit, for example. The optical signal reception device may determine whether there is an error in the received data 610 based on the parity bit corresponding to the error detection information 620.

The optical signal transmission device may also add the error correction information 630 to the data 610 such that the optical signal reception device receiving the data 610 may correct the data 610 with the error. The error correction information 630 may be information for correcting an error, for example, a Bose-Chaudhuri-Hocquenghem (BCH) code. The optical signal reception device may obtain size and related information of the data 610 based on the BCH code corresponding to the error correction information 630. When there is an error in the data 610, the optical signal reception device may correct the error in the data 610 based on the obtained information.

According to an example embodiment, the optical signal transmission device may add at least one of the error detection information 620 and the error correction information 630 to the data 610, or at least one of the error detection information 620 and the error correction information 630 may already be added to input data received by the optical signal transmission device.

Figure 7:
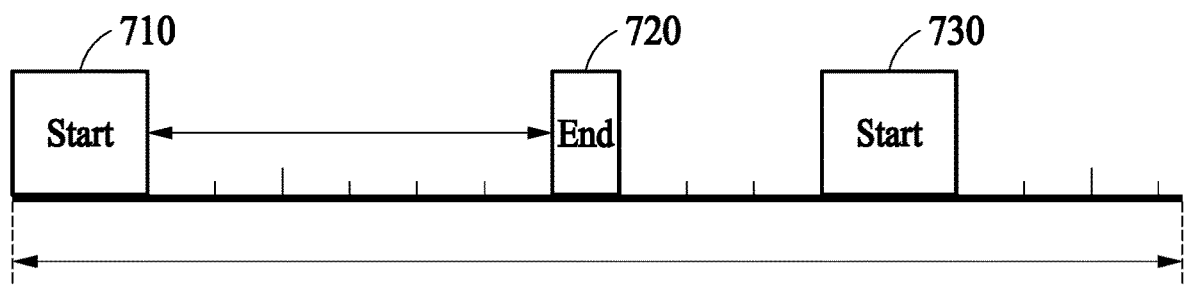
FIG. 7 is a diagram illustrating an example of an optical signal in which a start pulse and an end pulse have different widths according to a second example embodiment.

FIG. 7 is a diagram illustrating an example of an optical signal in which a start pulse and an end pulse have different widths according to a second example embodiment.

Referring to FIG. 7, according to a second example embodiment, an optical signal transmission device may transmit a start pulse 710 corresponding to a first optical signal and an end pulse 720 corresponding to the first optical signal. According to the second example embodiment, there may be six spaces in a time interval between the start pulse 710 corresponding to the first optical signal and the end pulse 720 corresponding to the first optical signal. An optical signal reception device may extract, from the first optical signal, a data value corresponding to the six spaces in the time interval between the start pulse 710 corresponding to the first optical signal and the end pulse 720 corresponding to the first optical signal. The optical signal reception device may receive the end pulse 720 corresponding to the first optical signal and wait until it receives a start pulse corresponding to a subsequent optical signal. The optical signal reception device may receive a start pulse 730 corresponding to a second optical signal, and start a time count until an end pulse corresponding to the second optical signal is received.

The optical signal reception device may recognize and distinguish the start pulses 710 and 730 and the end pulse 720 based on a characteristic that the start pulses 710 and 730 and the end pulse 720 have different widths. Each pulse width may indicate a time period in which a signal value is maintained or a logic level of 1 is maintained. That is, a pulse width may indicate a time period during which the optical signal transmission device maintains outputting light.

When the optical signal reception device receives the start pulse 710 corresponding to the first optical signal, the optical signal reception device may recognize a start of receiving the first optical signal based on the characteristic that the start pulses 710 and 730 and the end pulse 720 have different widths. When the optical signal reception device recognizes the start of receiving the first optical signal, the optical signal reception device may start a time count. When the optical signal reception device receives the start pulse 730 corresponding to the second optical signal while waiting to receive the end pulse 720 corresponding to the first optical signal, the optical signal reception device may stop a time count corresponding to the first optical signal and start a time count corresponding to the second optical signal. Since the optical signal reception device distinguishes the start pulses 710 and 730 and the ending pulse 720, the optical signal reception device may minimize an influence of an error on processing of a subsequent optical signal to be received even when the error occurs in a process of transmitting and receiving an optical signal.

Figure 8:
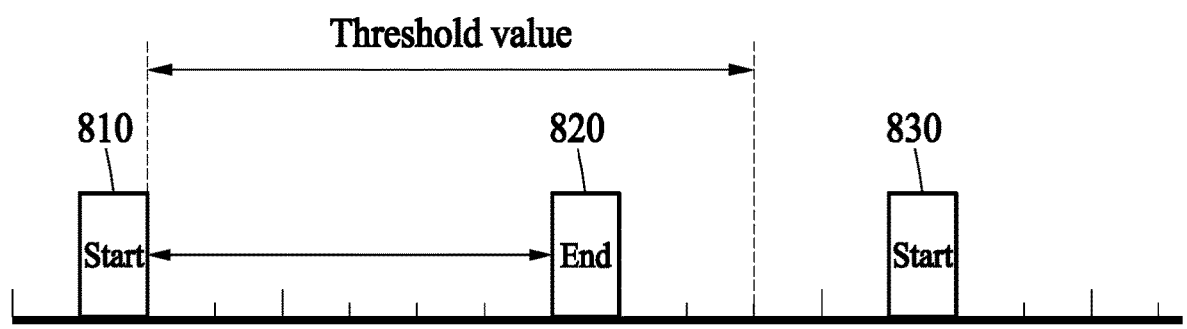
FIG. 8 is a diagram illustrating an example of an optical signal having a threshold value according to a third example embodiment.

FIG. 8 is a diagram illustrating an example of an optical signal having a threshold value according to a third example embodiment.

Referring to FIG. 8, according to a third example embodiment, an optical signal transmission device may set a threshold value for an optical signal and share the threshold value with an optical signal reception device. The threshold value for the optical signal may indicate a maximum value of a time interval between a start pulse and end pulse of the optical signal.

Referring to FIG. 8, the optical signal transmission device may determine a threshold value and share the threshold value with the optical signal reception device. The optical signal reception device may receive a start pulse 810 corresponding to a first optical signal and receive an end pulse 820 corresponding to the first optical signal afterwards. The optical signal reception device may receive the first optical signal by receiving the end pulse 820 corresponding to the first optical signal before a time count corresponding to the threshold value is reached after receiving the start pulse 810 corresponding to the first optical signal. After receiving the end pulse 820 corresponding to the first optical signal, the optical signal reception device may receive the start pulse 830 corresponding to the second optical signal. For normal reception of the second optical signal, the optical signal reception device may wait to receive an end pulse corresponding to the second optical signal.

In a case in which the widths of the start pulses 810 and 830 and the end pulse 820 are the same and the optical signal reception device is not able to distinguish a start pulse and an end pulse based solely on the widths of the pulses, even a one-time error that may occur in receiving one pulse may continue to affect reception of a subsequent optical signal by the optical signal reception device. In such a case, when, in the absence of the threshold value, the optical signal reception device fails to receive the end pulse 820 corresponding to the first optical signal after receiving the start pulse 810 corresponding to the first optical signal, the optical reception device may recognize the start pulse 830 corresponding to the second optical signal as an end pulse corresponding to the first optical signal and may thus extract incorrect data from the optical signals received from the optical signal transmission device.

In contrast, when, in the presence of the threshold value, the optical signal reception device does not receive the end pulse 820 corresponding to the first optical signal, the optical signal reception device may determine that an error occurs in receiving the first optical signal based on the threshold value. The optical signal reception device may receive the start pulse 830 corresponding to the second optical signal after a time interval corresponding to the threshold value has elapsed from a time point at which the start pulse 810 corresponding to the first optical signal is received, and may thus recognize the start pulse 830 corresponding to the second optical signal without an influence of an error. For example, the optical signal reception device may start a time count after receiving the start pulse 810 corresponding to the first optical signal. In this example, when the optical signal reception device does not receive the end pulse 820 corresponding to the first optical signal within a time count corresponding to the threshold value, the optical signal reception device may stop a time count corresponding to the first optical signal and wait for the start pulse 830 corresponding to the second optical signal.

The threshold value may also be applied to sub-data transmission. For example, the optical signal transmission device may divide 16-bit data into two sets of sub-data. The optical signal transmission device may divide the 16-bit data into 8-bit first sub-data and 8-bit second sub-data. The optical signal transmission device may modulate the first sub-data into a first optical signal and the second sub-data into a second optical signal, and transmit the first optical signal and the second optical signal to the optical signal reception device. In a state where the optical signal reception device successfully receives the first optical signal and obtains the first sub-data from the first optical signal, the optical signal reception device may wait to receive the second optical signal corresponding to the second sub-data that is to be combined with the first sub-data. However, when the optical signal reception device does not receive the second optical signal in an elapsed time corresponding to a preset threshold value, the optical signal reception device may recognize that an error occurs in optical signal communication. In such a case, the optical signal reception device may discard the first sub-data corresponding to the received first optical signal and wait for an optical signal corresponding to new data.

Figure 9:
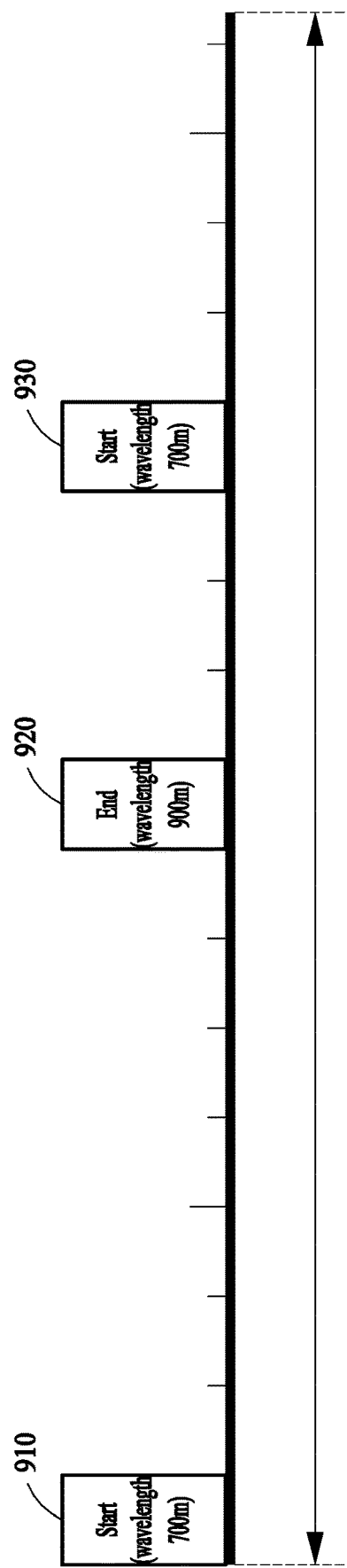
FIG. 9 is a diagram illustrating an example of an optical signal in which a start pulse and an end pulse have different wavelengths according to a fourth example embodiment.

FIG. 9 is a diagram illustrating an example of an optical signal in which a start pulse and an end pulse have different wavelengths according to a fourth example embodiment.

Referring to FIG. 9, according to a fourth example embodiment, an optical signal may include a start pulse and an end pulse. A wavelength of the start pulse and a wavelength of the end pulse may be different from each other.

An optical signal transmission device may transmit a start pulse 910 corresponding to a first optical signal and an end pulse 920 corresponding to the first optical signal to an optical signal reception device. The optical signal reception device may receive the end pulse 920 corresponding to the first optical signal and then wait until a start pulse corresponding to a subsequent optical signal is received. The optical signal reception device may receive a start pulse 930 corresponding to a second optical signal and start counting until an end pulse corresponding to the second optical signal is received in response to the receiving.

The wavelengths of the start pulses 910 and 930 and the end pulse 920 may be different from each other. For example, the optical signal transmission device may set the wavelengths of the start pulses 910 and 930 to 700 nanometers (nm) and the wavelength of the end pulse to 900 nm. The optical signal reception device may recognize and distinguish the start pulses 910 and 930 and the end pulse 920 based on a characteristic that the wavelengths of the start pulses 910 and 930 and the end pulse 920 are different from each other.

When the optical signal reception device receives the start pulse 910 corresponding to the first optical signal, the optical signal reception device may recognize a start of receiving the first optical signal based on the characteristic that the wavelengths of the start pulses 910 and 930 and the end pulse 920 are different. The optical signal reception device recognizing the start of receiving the first optical signal may start a time count. When the optical signal reception device receives the start pulse 930 corresponding to the second optical signal while waiting to receive the end pulse 920 corresponding to the first optical signal, the optical signal reception device may stop a time count corresponding to the first optical signal and start a time count corresponding to the second optical signal. Since the optical signal reception device may distinguish the start pulses 910 and 930 and the end pulse 920 based on the wavelengths of the start pulses 910 and 930 and the end pulse 920, the optical signal reception device may minimize an influence of an error on processing of a subsequent optical signal to be received by the optical signal reception device even when an error occurs in a process of transmitting and receiving one optical signal.

Figure 10:
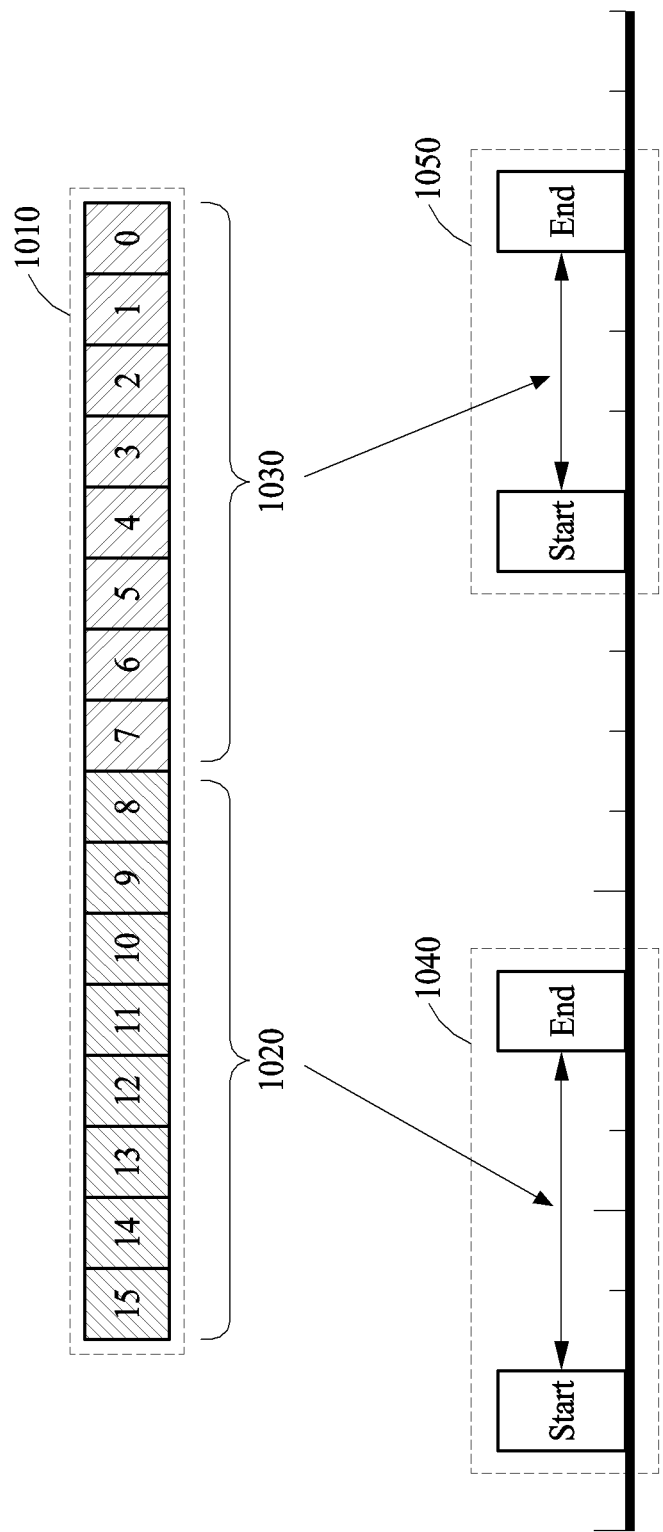
FIG. 10 is a diagram illustrating examples of optical signals generated based on sets of sub-data divided from data according to a fifth example embodiment.

FIG. 10 is a diagram illustrating examples of optical signals generated based on sets of sub-data divided from data according to a fifth example embodiment.

Referring to FIG. 10, according to a fifth example embodiment, an optical signal transmission device may divide input data 1010 into a plurality of sets of sub-data 1020 and 1030 and generate optical signals 1040 and 1050 respectively corresponding to the divided sets of the sub-data 1020 and 1030. The input data 1010 may be divided into first sub-data 1020 and second sub-data 1030. The optical signal transmission device may generate a first optical signal 1040 from the first sub-data 1020 and generate a second optical signal 1050 from the second sub-data 1030.

Each of the first optical signal 1040 and the second optical signal 1050 may include a start pulse and an end pulse. An optical signal reception device may distinguish and receive the first optical signal 1040 and the second optical signal 1050 based on whether the start pulse and the end pulse are received. An optical signal reception device may demodulate the first optical signal 1040 to obtain the first sub-data 1020 corresponding to the first optical signal 1040, and demodulate the second optical signal 1050 to obtain the second sub-data 1030 corresponding to the second optical signal 1050. The optical signal reception device may combine the first sub-data 1020 and the second sub-data 1030 to obtain the data 1010.

Figure 11:
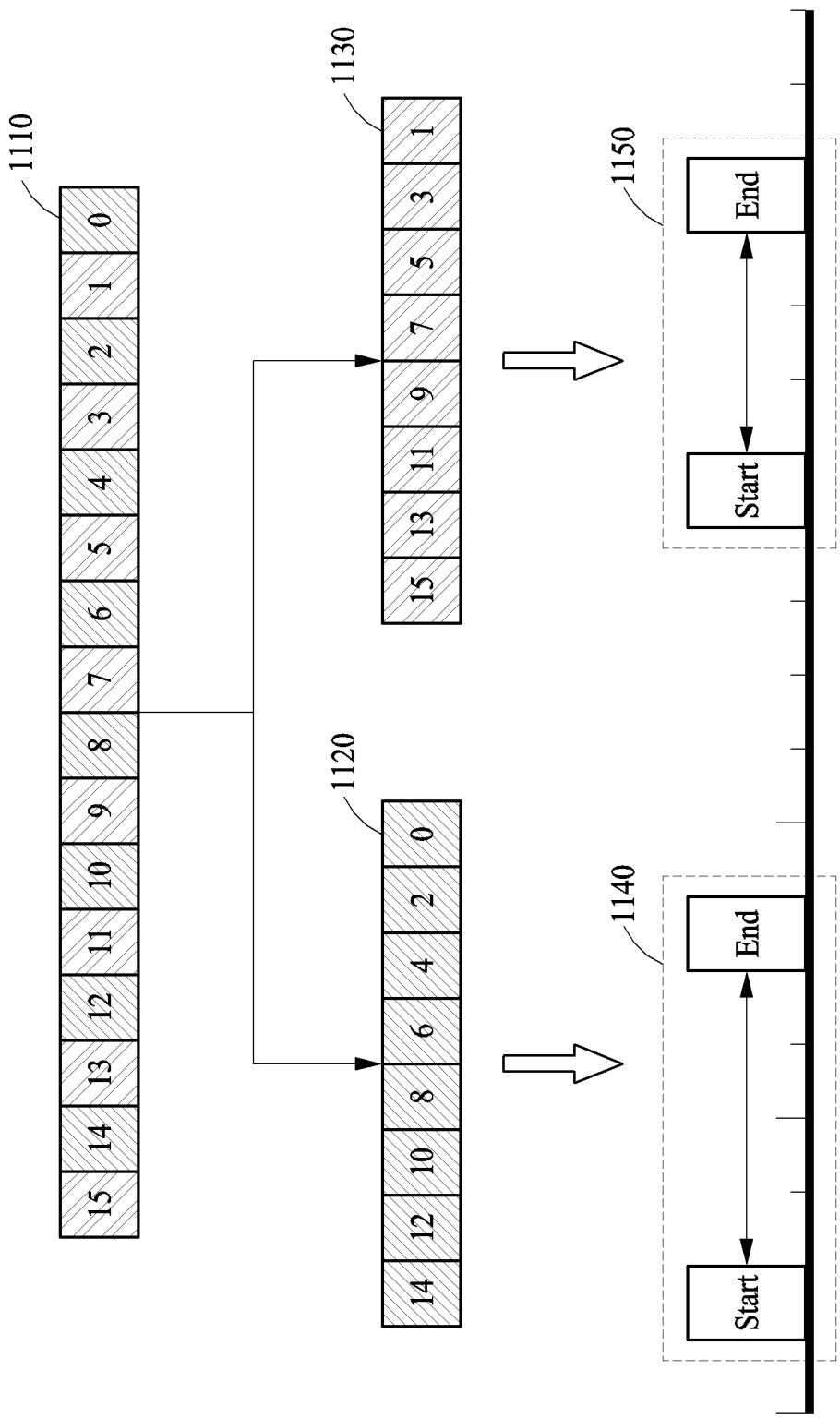
FIG. 11 is a diagram illustrating examples of optical signals generated by dividing data into even bits and odd bits according to a sixth example embodiment.

FIG. 11 is a diagram illustrating examples of optical signals generated by dividing data into even bits and odd bits according to a sixth example embodiment.

Referring to FIG. 11, according to a sixth example embodiment, an optical signal transmission device may divide input data 1110 into first sub-data 1120 and second sub-data 1130. The optical signal transmission device may divide the input data 1110 into even bits and odd bits and divide the input data 1110 into the first sub-data 1120 including the even bits and the second sub-data 1130 including the odd bits. The optical signal transmission device may generate a first optical signal 1140 corresponding to the first-sub data 1120 and a second optical signal 1150 corresponding to the second sub-data 1130.

The optical signal transmission device may transmit the first optical signal 1140 and the second optical signal 1150 to an optical signal reception device. The optical signal reception device may receive the first optical signal 1140 and the second optical signal 1150 based on a start pulse and an end pulse included in each of the first optical signal 1140 and the second optical signal 1150.

The optical signal reception device may perform demodulation on the first optical signal 1140 and the second optical signal 1150 to obtain the first sub-data 1120 corresponding to the first optical signal 1140 and the second sub-data 1130 corresponding to the second optical signal 1150. The optical signal reception device may combine the first sub-data 1120 and the second sub-data 1130 to obtain data transmitted by the optical signal transmission device.

When the optical signal transmission device transmits an optical signal or the optical signal reception device receives the optical signal, a lower bit may be more susceptible to a transmission and reception error. In addition, when an error occurs during transmission and reception, a difference between the data 1110 and the data obtained by the optical signal reception device through demodulation may increase as sub-data corresponds to an upper bit. A method by which the optical signal transmission device modulates the input data 1110 into an optical signal by dividing the input data 1110 into a plurality of sets of sub-data, and transmits the optical signal to the optical signal reception device may allow an upper bit to be more susceptible to an error. Thus, the optical signal transmission device may divide the input data 1110 into even bits and odd bits and divide the input data 1110 into the first sub-data 1120 including the even bits and the second sub-data 1130 including the odd bits. The optical signal transmission device may generate the first optical signal 1140 corresponding to the first sub-data 1120 and generate the second optical signal 1150 corresponding to the second sub-data 1130. Thus, the optical signal transmission device may minimize a transmission and reception error that may occur due to the dividing of the input data 1110. The dividing of the input data 1110 by the optical signal transmission device may not be limited to the foregoing example. According to example embodiments, the optical signal transmission device may divide the input data 1110 into three or more sets of sub-data, and a method of dividing the input data 1110 may not be limited to the foregoing example.

Figure 12:
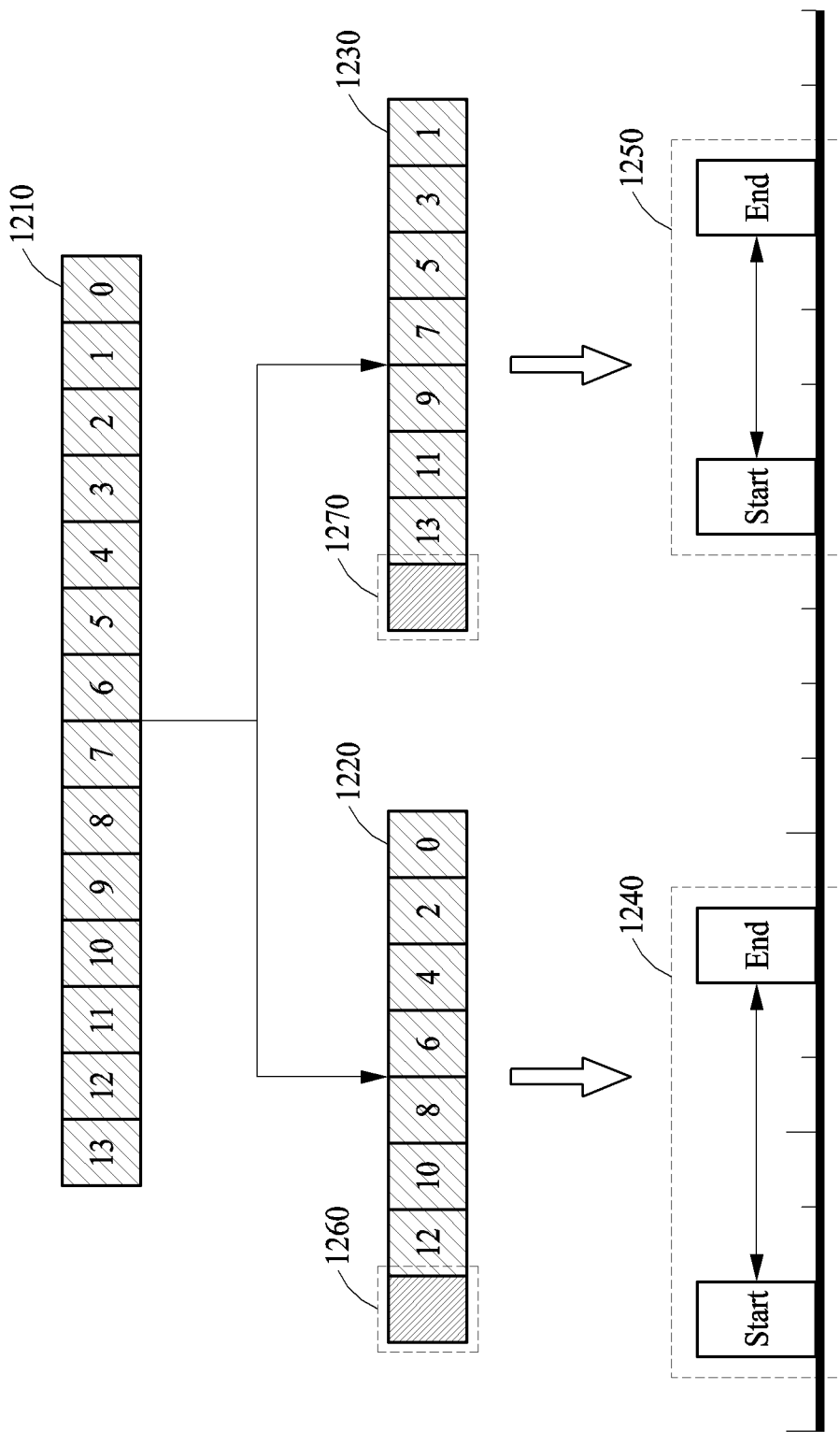
FIG. 12 is a diagram illustrating an example of an optical signal including an identifier bit according to a seventh example embodiment.

FIG. 12 is a diagram illustrating an example of an optical signal including an identifier bit according to a seventh example embodiment.

Referring to FIG. 12, according to a seventh example embodiment, an optical signal transmission device may divide input data 1210 into first sub-data 1220 and second sub-data 1230. The optical signal transmission device may generate a first optical signal 1240 based on the first sub-data 1220 and transmit the first optical signal 1240 to an optical signal reception device. The optical signal transmission device may also generate a second optical signal 1250 based on the second sub-data 1230 and transmit the second optical signal 1250 to the optical signal reception device.

The first sub-data 1220 and the second sub-data 1230 may include respective identifier bits 1260 and 1270 that indicate whether the first sub-data 1220 and the second sub-data 1230 include even bits or odd bits of the input data 1210. The first sub-data 1220 may include the even bits of the input data 1210. The first sub-data 1220 may include a first identifier bit 1260 indicating that the first sub-data 1220 includes the even bit of the input data 1210. The second sub-data 1230 may include the odd bits of the input data 1210. The second sub-data 1230 may include a second identifier bit 1270 indicating that the second sub-data 1230 includes the odd bits of the input data 1210.

According to another example embodiment, the first sub-data 1220 and the second sub-data 1230 may include identifier bits to identify different bits, irrespective of the even bits and the odd bits. For example, the first sub-data 1220 may include a data value of first bits. The first sub-data 1220 may additionally include a first identifier bit 1260 indicating that the first sub-data 1220 includes the data value of the first bits. The second sub-data 1230 may include a data value of second bits distinguished from the first bits. The second sub-data 1230 may additionally include a second identifier bit 1270 indicating that the second sub-data 1230 includes the data value of the second bits.

The optical signal reception device may receive the first optical signal 1240 and the second optical signal 1250. The optical signal reception device may obtain the first sub-data 1220 based on the first optical signal 1240 and the second sub-data 1230 based on the second optical signal 1250. The optical signal reception device may combine the first sub-data 1220 and the second sub-data 1230 based on the first identifier bit 1260 included in the first sub-data 1220 and the second identifier bit 1270 included in the second sub-data 1230.

According to another example embodiment, the optical signal reception device may receive the first optical signal 1240, and obtain the first sub-data 1220 and the first identifier bit 1260 included in the first sub-data 1220 from the first optical signal 1240. Subsequently, when the optical signal reception device receives an optical signal, and sub-data and an identifier bit obtained from the optical signal are not associated with the first identifier bit 1260, the optical signal reception device may determine that an error occurs in receiving sub-data that is to be combined with the first sub-data 1220. In this case, the optical signal reception device may not receive the input data 1210 corresponding to the first sub-data 1220, but wait to receive an optical signal subsequently.

Figure 13:
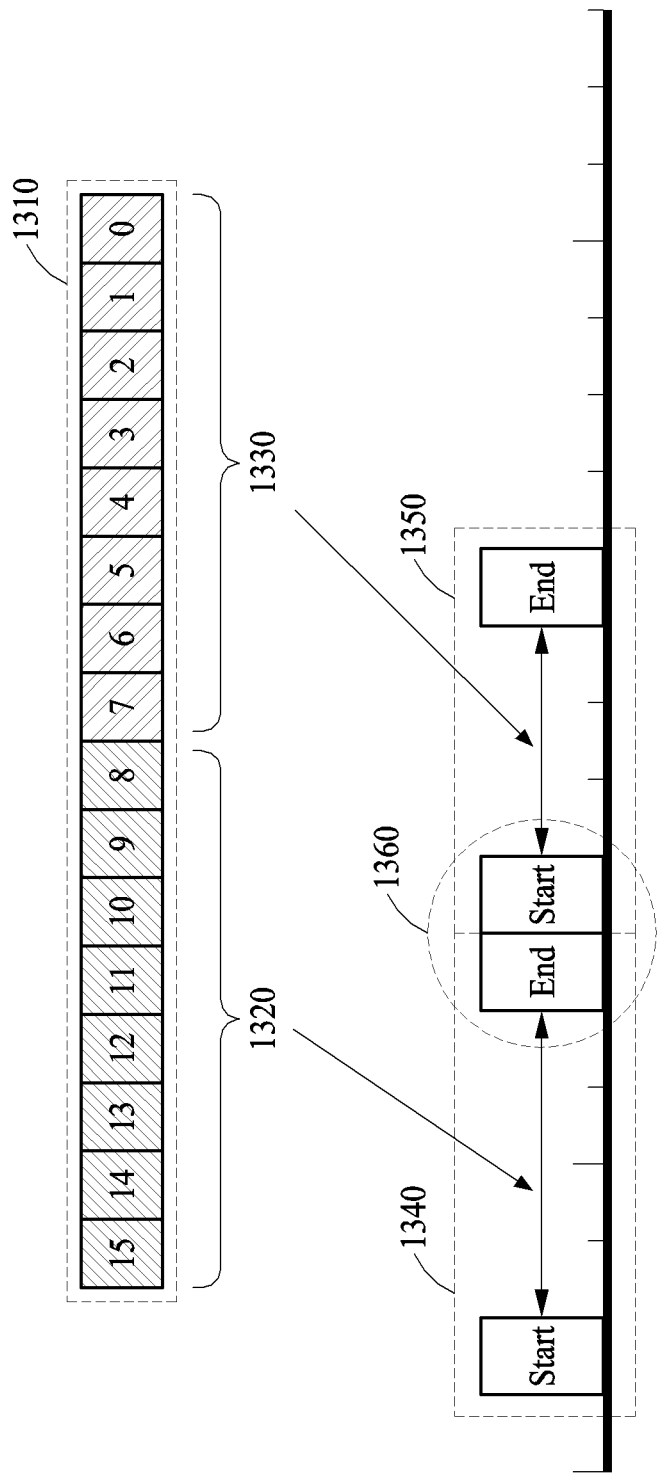
FIG. 13 is a diagram illustrating examples of optical signals generated based on sets of sub-data divided from data according to an eighth example embodiment.

FIG. 13 is a diagram illustrating examples of optical signals generated based on sets of sub-data divided from data according to an eighth example embodiment.

Referring to FIG. 13, according to an eighth example embodiment, an optical signal transmission device may divide input data 1310 into a plurality of sets of sub-data 1320 and 1330 and generate optical signals 1340 and 1350 respectively corresponding to the divided sets of sub-data 1320 and 1330. An end pulse of the first optical signal 1340 and a start pulse of the second optical signal 1350 may be represented by one optical signal 1360.

An optical signal reception device may distinguish and receive the first optical signal 1340 and the second optical signal 1350 based on whether a start pulse and an end pulse are received. The optical signal 1360 represented by the end pulse of the first optical signal 1340 and the start pulse of the second optical signal 1350 may be distinguished from the start pulse of the first optical signal 1340 and the end pulse of the second optical signal 1350 based on differences in wavelength, pulse length, and/or reception order of pulses to be received by the optical signal reception device. The optical signal reception device may demodulate the first optical signal 1340 to obtain the first sub-data 1320 that is data corresponding to the first optical signal 1340, and demodulate the second optical signal 1350 to obtain the second sub-data 1330 corresponding to the second optical signal 1350. The optical signal reception device may combine the first sub-data 1320 and the second sub-data 1330, and obtain the data 1310.

Figure 14:
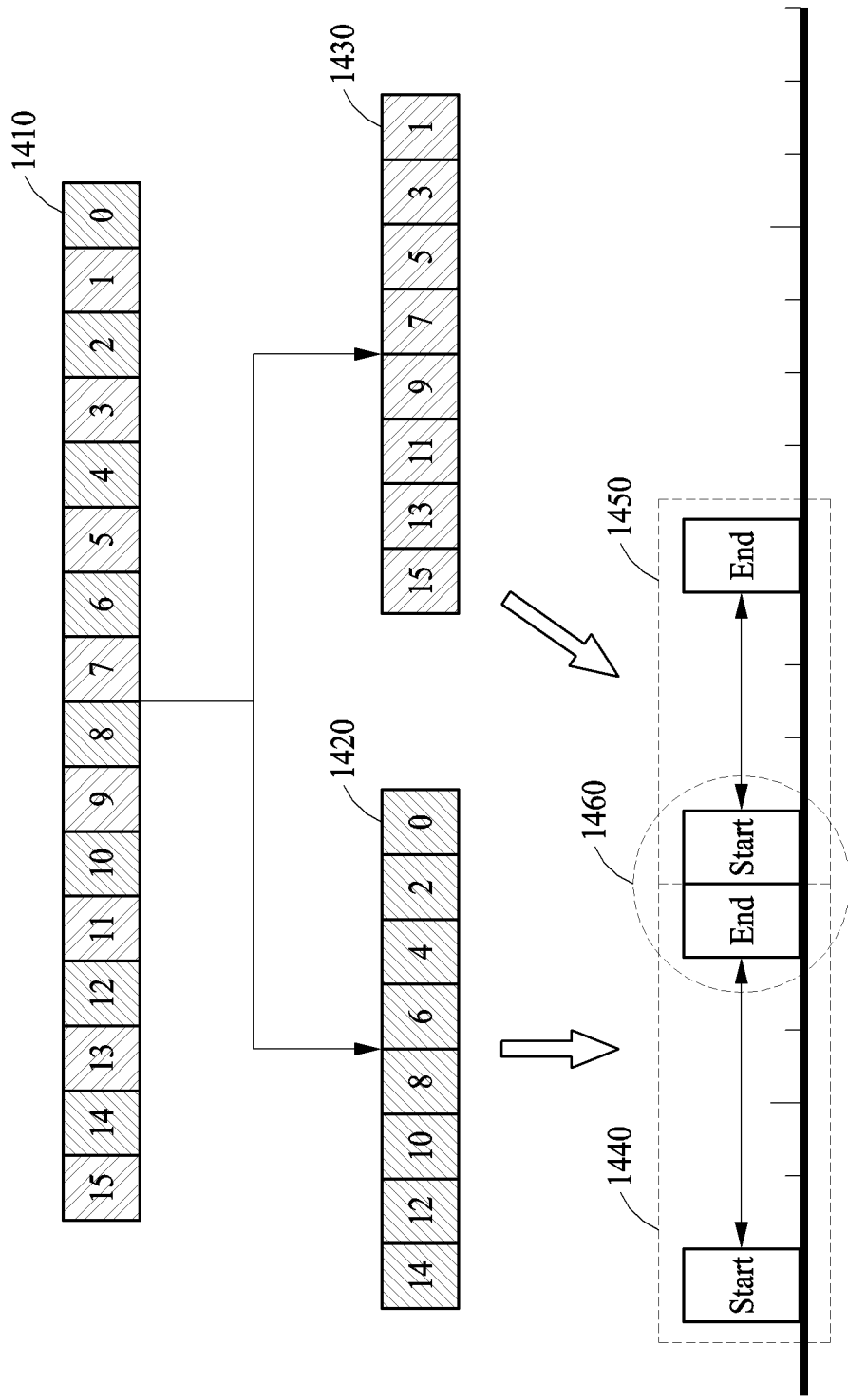
FIG. 14 is a diagram illustrating examples of optical signals generated by dividing data into even bits and odd bits according to a ninth example embodiment.

FIG. 14 is a diagram illustrating examples of optical signals generated by dividing data into even bits and odd bits according to a ninth example embodiment.

Referring to FIG. 14, according to a ninth example embodiment, an optical signal transmission device may divide input data 1410 into first sub-data 1420 and second sub-data 1430. The optical signal transmission device may divide the input data 1410 into even bits and odd bits, and divide the input data 1410 into the first sub-data 1420 including the even bits and the second sub-data 1430 including the odd bits. The optical signal transmission device may generate a first optical signal 1440 corresponding to the first sub-data 1420 and generate a second optical signal 1450 corresponding to the second sub-data 1430. An end pulse of the first optical signal 1440 and a start pulse of the second optical signal 1450 may be represented by one optical signal 1460.

An optical signal reception device may receive the first optical signal 1440 and the second optical signal 1450, perform demodulation on the received first optical signal 1440 and the received second optical signal 1450, and obtain the first sub-data 1420 and the second sub-data 1430 respectively corresponding to the first optical signal 1440 and the second optical signal 1450. The optical signal 1460 represented by the end pulse of the first optical signal 1440 and the start pulse of the second optical signal 1450 may be distinguished from the start pulse of the first optical signal 1440 and the end pulse of the second optical signal 1450 based on differences in wavelength, pulse length, and/or reception order of pulses to be received by the optical signal reception device. The optical signal reception device may combine the first sub-data 1420 and the second sub-data 1430, and obtain data transmitted by the optical signal transmission device.

Figure 15:
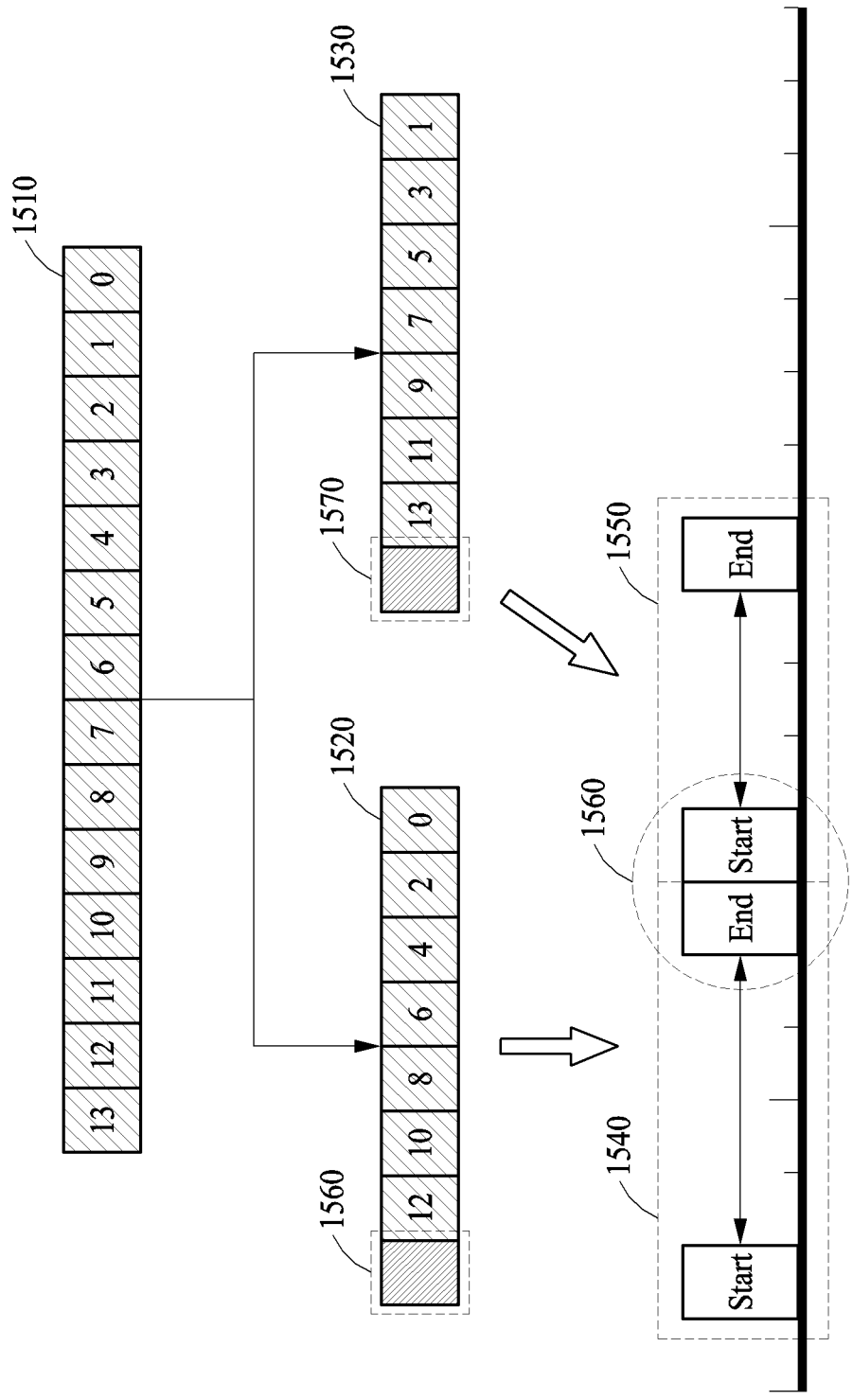
FIG. 15 is a diagram illustrating an example of an optical signal including an identifier bit according to a tenth example embodiment.

FIG. 15 is a diagram illustrating an example of an optical signal including an identifier bit according to a tenth example embodiment.

Referring to FIG. 15, according to a tenth example embodiment, an optical signal transmission device may divide input data 1510 into first sub-data 1520 and second sub-data 1530. The optical signal transmission device may generate a first optical signal 1540 based on the first sub-data 1520 and transmit the first optical signal 1540 to an optical signal reception device. The optical signal transmission device may also generate a second optical signal 1550 based on the second sub-data 1530 and transmit the second optical signal 1550 to the optical signal reception device. An end pulse of the first optical signal 1540 and a start pulse of the second optical signal 1550 may be represented by one optical signal 1560.

The first sub-data 1520 and the second sub-data 1530 may include respective identifier bits 1560 and 1570 indicating whether the first sub-data 1520 and the second sub-data 1530 include event bits or odd bits of the input data 1510. According to another example embodiment, the first sub-data 1520 and the second sub-data 1530 may include identifier bits for identifying different bits, irrespective of the even bits and the odd bits.

The optical signal reception device may receive the first optical signal 1540 and the second optical signal 1550. The optical signal reception device may obtain the first sub-data 1520 based on the first optical signal 1540, and obtain the second sub-data 1530 based on the second optical signal 1550. The optical signal 1560 represented by the end pulse of the first optical signal 1540 and the start pulse of the second optical signal 1550 may be distinguished from the start pulse of the first optical signal 1540 and the end pulse of the second optical signal 1550 based on differences in wavelength, pulse length, and/or reception order of pulses to be received by the optical signal reception device.

The optical signal reception device may combine the first sub-data 1520 and the second sub-data 1530 based on a first identifier bit 1560 included in the first sub-data 1520 and a second identifier bit 1570 included in the second sub-data 1530. The optical signal reception device may determine whether an error occurs based on the first identifier bit 1560 included in the first optical signal 1540, and determine whether an error occurs based on the second identifier bit 1570 included in the second optical signal 1550.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An optical signal communication method performed by an optical signal transmission device, the optical signal communication method comprising:
    receiving input data to be modulated into an optical signal;
    modulating the input data into the optical signal; and
    transmitting the optical signal to an optical signal reception device,
        wherein the optical signal comprises a start pulse and an end pulse,
            wherein a time interval between the start pulse and the end pulse is determined based on a data value of the input data,
            wherein the optical signal reception device determines that an error occurred in receiving an optical signal comprising the start pulse when the end pulse is not received before a time count corresponding to a threshold value is completed after the start pulse is received, and determines that the optical signal based on the start pulse and the end pulse is not demodulated when a time interval between a time point at which the stat pulse is received and a time point at which the end pulse is received is greater than the threshold value,
            wherein the threshold value is maximum value of a time interval between a time point at which the start pulse is recognized and a time point at which the end pulse is recognized, and is preset and shard between the optical signal transmission device and the optical signal reception device.

2. The optical signal communication method of claim 1, wherein a wavelength of the start pulse and a wavelength of the end pulse are different from each other.

3. The optical signal communication method of claim 1, wherein the optical signal comprises only the start pulse and the end pulse and does not comprise another pulse between the start pulse and the end pulse.

4. The optical signal communication method of claim 1, wherein the modulating the input data into the optical signal comprises:
    dividing the input data into first sub-data and second sub-data; and
    modulating the first sub-data and the second sub-data into a first optical signal and a second optical signal, respectively,
        wherein the first optical signal corresponding to the first sub-data represents a data value of first bits of the input data,
        wherein the second optical signal corresponding to the second sub-data represents a data value of second bits of the input data.

5. The optical signal communication method of claim 4, wherein the optical signal reception device is configured to:

receive at least one of the first optical signal and the second optical signal from the optical signal transmission device, and determine not to demodulate the received at least one of the first optical signal and the second optical signal when a time interval between a time point at which the first optical signal is received and a time point at which the second optical signal is received is greater than a preset threshold value.

6. The optical signal communication method of claim 4, wherein the first bits and the second bits correspond to an upper bit and a lower bit of the input data, respectively, or correspond to even bits and odd bits of the input data, respectively.

7. The optical signal communication method of claim 4, wherein, in the modulating the input data into the optical signal, each of the first sub-data and the second sub-data comprises an identifier bit indicating whether each of the first sub-data and the second sub-data comprises the first bits or second bits of the input data.

8. An optical signal communication method performed by an optical signal reception device, the optical signal communication method comprising:
  receiving an optical signal from an optical signal transmission device; and
  obtaining data corresponding to the optical signal by demodulating the received optical signal,
  wherein the optical signal comprises a start pulse and an end pulse,
    wherein a time interval between the start pulse and the end pulse is determined based on a data value of the data,
      wherein a time interval between the start pulse and the end pulse is determined based on a data value of the data,
      wherein the optical signal transmission device sets and transmits a threshold value,
      wherein the optical signal reception device determines that an error occurred in receiving an optical signal comprising the start pulse when the end pulse is not received before a time count corresponding to the threshold value is completed after the start pulse is received, and determines that the optical signal based on the start pulse and the end pulse is not demodulated when a time interval between a time point at which the start pulse is recognized and a time point at which the end pulse is recognized is greater than the threshold value,
      wherein the threshold value is a maximum value of a time interval between a time point at which the start pulse is recognized and a time point at which the end pulse is recognized.

9. The optical signal communication method of claim 8, wherein the obtaining of the data comprises:
  determining the data corresponding to the optical signal based on a time interval between the start pulse and the end pulse received from the optical signal transmission device.

10. The optical signal communication method of claim 8, wherein the optical signal comprises at least one of error detection information for determining whether there is an error in the optical signal and error correction information for correcting the error of the optical signal.

11. The optical signal communication method of claim 8, wherein a width of the start pulse and a width of the end pulse are different from each other.

12. The optical signal communication method of claim 11, wherein the optical signal reception device is configured to recognize the start pulse and the end pulse based on the widths of the signal pulses comprised in the optical signal.

13. The optical signal communication method of claim 12, wherein, when a second start pulse is sequentially recognized after a first start pulse, the optical signal reception device is configured to determine not to demodulate an optical signal that is based on the first start pulse.

14. The optical signal communication method of claim 8, wherein, when a time interval between a time point at which the start pulse is recognized and a time point at which the end pulse is recognized is greater than a threshold value, the optical signal reception device is configured to determine not to demodulate the optical signal that is based on the start pulse and the end pulse.

15. An optical signal transmission device for performing an optical signal communication method, the optical signal transmission device comprising:
  a modulator configured to modulate input data into an optical signal; and
  a communicator configured to transmit the optical signal to an optical signal reception device,
  wherein the optical signal comprises a start pulse and an end pulse,
    wherein a time interval between the start pulse and the end pulse is determined based on a data value of the input data,
    wherein the optical signal reception device determines that an error occurred in receiving an optical signal comprising the start pulse when the end pulse is not received before a time count corresponding to a threshold vale is completed after the start pulse is received, and determines that the optical signal based on the start pulse and the end pulse is not demodulated when a time interval between a time point at which the start pulse is received and a time point at which the end pulse is received is greater than the threshold value,
    wherein the threshold value is a maximum value of a time interval between a time point at which the start pulse is recognized and a time point at which the end pulse is recognized, and is preset and shared between the optical signal transmission device and the optical signal reception device.

16. The optical signal transmission device of claim 15, wherein a wavelength of the start pulse and a wavelength of the end pulse are different from each other.

17. An optical signal reception device for performing an optical signal communication method, the optical signal reception device comprising:
  a communicator configured to receive an optical signal from an optical signal transmission device; and
  a demodulator configured to obtain data corresponding to the optical signal by demodulating the received optical signal,
  wherein the optical signal comprises a start pulse and an end pulse,
    wherein a time interval between the start pulse and the end pulse is determined based on a data value of the data,
    wherein the optical signal transmission device sets and transmits a threshold value,
    wherein the optical signal reception device determines that an error occurred in receiving an optical signal comprising the start pulse when the end pulse is not received before a time count corresponding to the threshold value is completed after the start pulse is receiving, and determines that the optical signal based on the start pulse and the end pulse is not demodulated when a time interval between a time point at which the start pulse is recognized and a time point at which the end pulse is recognized is greater than the threshold value, wherein the threshold value is a maximum value of a time interval between a time point at which the start pulse is recognized and a time point at which the end pulse is recognized.

18. The optical signal reception device of claim 17, wherein a wavelength of the start pulse and a wavelength of the end pulse are different from each other, wherein the optical signal reception device is configured to recognize the start pulse and the end pulse based on the wavelengths of the signal pulses comprised in the optical signal.

19. The optical signal reception device of claim 17, being configured to determine reception of the optical signal to be unsuccessful and determine not to demodulate an optical signal that is based on signal pulses of the same type, when start pulses are sequentially recognized or end pulses are sequentially recognized.

20. The optical signal reception device of claim 17, wherein the demodulator is configured to:

determine whether the data is upper data or lower data based on an identifier bit comprised in the obtained data; and when an error is determined to be present in the received optical signal based on the identifier bit, determine not to demodulate the received optical signal.

* * * * *